United States Patent [19]
Tada et al.

[11] Patent Number: 6,032,369
[45] Date of Patent: *Mar. 7, 2000

[54] PORTABLE TRIMMER INCLUDING MEANS FOR SECURELY RETAINING STICK THAT PREVENTS ROTATION OF CUTTING MEMBER

[75] Inventors: Osamu Tada; Takayuki Yamamoto, both of Tokyo, Japan

[73] Assignee: Kioritz Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/982,020

[22] Filed: Dec. 1, 1997

[30] Foreign Application Priority Data

Dec. 2, 1996 [JP] Japan .................................. 8-321795

[51] Int. Cl.[7] .................................................. B26B 27/00
[52] U.S. Cl. .............................. 30/276; 30/329; 56/12.7
[58] Field of Search .............................. 30/276, 347, 342, 30/329, 388; 83/666, 665, 698.4; 56/12.7

[56] References Cited

U.S. PATENT DOCUMENTS

| | | | |
|---|---|---|---|
| 854,468 | 5/1907 | Crosby | 30/347 X |
| 3,708,967 | 1/1973 | Giest et al. | 56/12.7 X |
| 3,781,991 | 1/1974 | Stretton et al. | 30/347 X |
| 4,301,642 | 11/1981 | Thurber | 56/12.7 X |
| 4,335,510 | 6/1982 | Close et al. | 30/276 X |
| 4,630,371 | 12/1986 | Graham | 30/347 X |
| 4,690,252 | 9/1987 | Kottke et al. . | |
| 4,744,148 | 5/1988 | Brown | 30/276 X |
| 4,845,929 | 7/1989 | Kawaski et al. | 56/12.7 X |
| 4,858,321 | 8/1989 | McCullough | 30/276 X |
| 5,758,424 | 6/1998 | Iacona et al. | 30/347 X |
| 5,778,747 | 7/1998 | Chen | 30/388 X |

FOREIGN PATENT DOCUMENTS

| | | |
|---|---|---|
| 59-98613 | 6/1984 | Japan . |
| 4-110431 | 9/1992 | Japan . |

*Primary Examiner*—M. Rachuba
*Attorney, Agent, or Firm*—Thelen Reid & Priest, LLP

[57] ABSTRACT

A portable trimmer has a supporting tube with a forward end on which is mounted a cutting device. The cutting device has a case with a first hole for receiving a stick, and also contains a rotatable shaft with a threaded end. A seating member that is rotatable with the shaft has a second hole that can be aligned with the case's first hole. A rotatable cutter is removably mounted on the rotatable shaft, fixed to against the seating member by a nut that engages the shaft's threads. The stick is inserted into the first hole in the case and the second hole in the rotatable seating member, to prevent rotation of the seating member during assembly and disassembly. The cutting device retains the stick in the first and second holes even when the cutting device is upside down. This retention is accomplished, either by a biasing member that biases the stick in a direction perpendicular to the axis of the first hole, or by an elastic member that frictionally engages the stick in the hole.

6 Claims, 9 Drawing Sheets

PORTABLE TRIMMER INCLUDING MEANS FOR SECURELY RETAINING STICK THAT PREVENTS ROTATION OF CUTTING MEMBER

CROSS-REFERENCE TO RELATED APPLICATION

This application claims priority to Japanese patent application No. Hei 8-321795, filed on Dec. 2, 1996, which is incorporated herein by reference in its entirety.

BACKGROUND OF THE INVENTION

1. Field of the Invention

The present invention relates to a portable trimmer for cutting weeds or the like, and, more particularly, to a portable trimmer that uses a stick for preventing rotation of the trimmer's cutting portion when the cutting portion is being assembled and disassembled.

2. Related Art

Portable trimmers for cutting weeds are known in the art. A typical portable trimmer has driving means such as a compact air-cooled two-stroke gasoline internal combustion engine, a supporting tube extending straight from the engine in a forward direction, and a cutting device provided at a forward end of the supporting tube. An operator hangs a strap over the shoulder to support the portable trimmer at a height corresponding to the hip, and moves the rotating cutter in the right and left directions to cut weeds by maneuvering handles mounted on the supporting tube.

Figure 8:
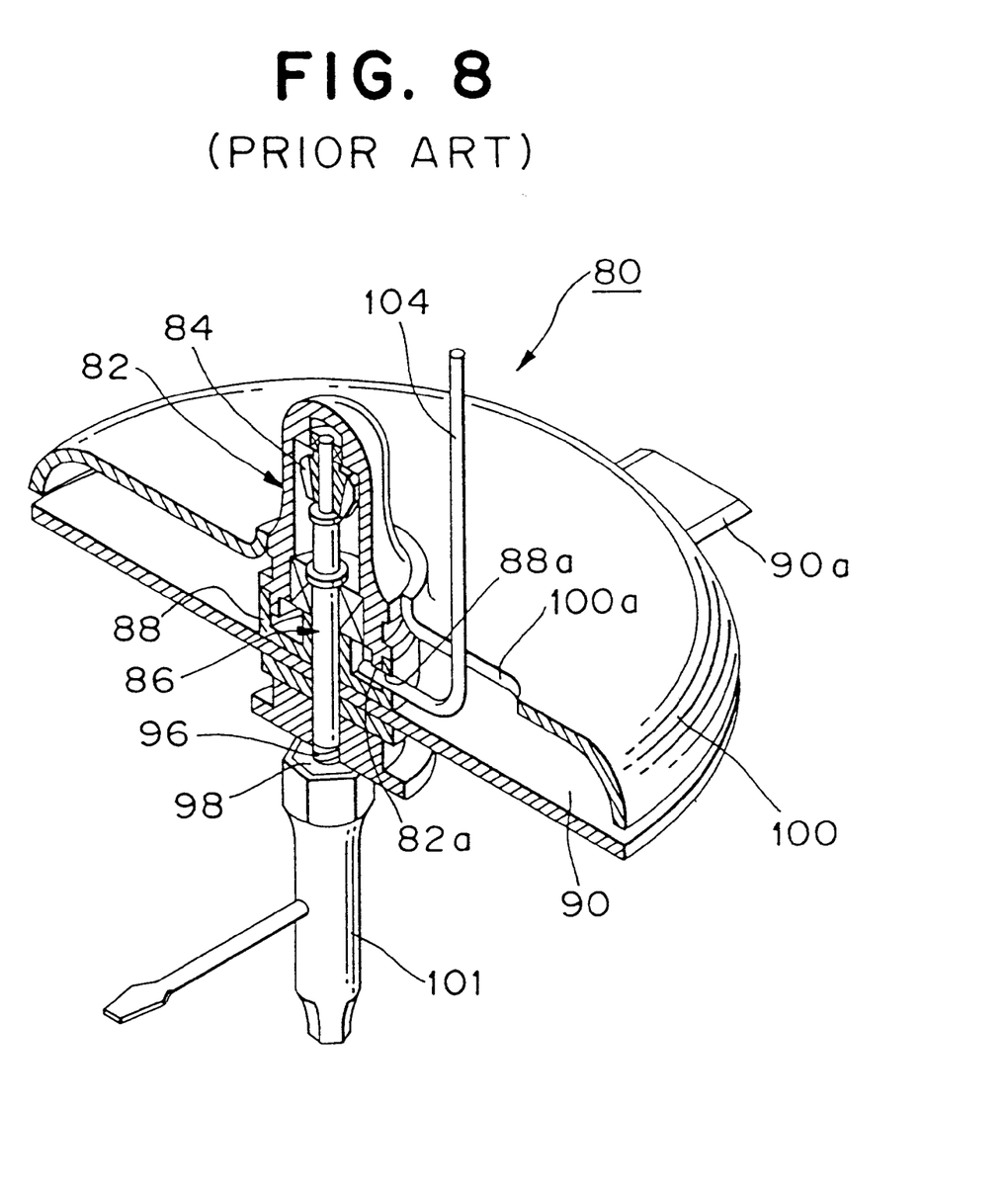
FIG. 8 is an example of a cutting device of a conventional portable trimmer.

FIG. 8 shows a cross-sectional view of a cutting device 80, which is a so-called "section blade cutter" in a conventional portable trimmer. The cutting device 80 has a case 82 fixed to the forward end of the supporting tube, a rotatable shaft 86 vertically extending toward the ground and rotatably driven by a gear 84 accommodated in the case 82, a seating member 88 that is rotatable with the rotatable shaft 86, a circular plate 90 removably mounted on a lower side of the seating member 88 and having a plurality of section blades 90*a* attached at regular intervals along a circumference thereof (only one section blade 90*a* being shown in FIG. 8), and a nut 98 which is threadably engaged with threaded portion 96 to fix the circular plate 90 to the seating member 88.

The circular plate 90 needs to be disassembled for grinding or replacing the blade 90*a*. Holes 82*a* and 88*a* are formed in the case 82 and the seating element 88, respectively. To remove the circular plate 90, a bar 104 for preventing rotation of the seating member 88 is inserted in a slit 100*a* formed in a safety cover 100 and then into both holes 82*a* and 88*a*, to prevent the rotation of the seating member 88 and the rotatable shaft 86 with respect to the Since the nut 98 is mounted on a lower end of the rotatable shaft 86, the cutting device 80 needs to be turned upside down on the ground to remove the nut 98.

However, when the conventional cutting device 80 is oriented upside down, the bar 104 falls out of the holes 82*a* and 88*a*. Therefore, the operator must continue holding the bar 104 throughout the disassembly operation, which is troublesome for the operator. Further, the same problem arises when the circular plate 90 is assembled by following the above steps in reverse order.

SUMMARY OF THE INVENTION

It is, therefore, an object of the present invention to prevent the bar form falling during assembly and disassembly of the cutter.

It is a further object of the invention to achieve the above object by a simple means that can be mounted on a conventional portable trimmer.

The above and other objects of the present invention can be accomplished by a portable trimmer having a supporting tube and a cutting device mounted on a forward end of the supporting tube. The inventive cutting device includes 1) a case fixed to the forward end of the supporting tube, and having a first hole; 2) a rotatable shaft, mounted within the case, and having an end portion with an outer surface on which threads are formed; 3) a seating member, rotatable with the rotatable shaft, and having a second hole; 4) a rotatable cutter that is removably mounted on the rotatable shaft; 5) fastening means for fixing the rotatable cutter against the seating member by threadably engaging with the threads of the rotatable shaft; 6) a stick, insertable into the first hole and second hole, for preventing rotation of the seating member; and 7) a biasing member for biasing the stick in a radial direction of the first hole, when the stick is inserted into the first hole and the second hole. Alternative to the biasing portion is an elastic portion that frictionally engages the stick to retain it in the holes.

To disassemble the rotatable cutter, the stick is inserted into the first and second holes against a biasing force exerted by the biasing member. The stick is biased by the biasing member in the radial direction, perpendicular to the elongated axis of the first hole, so that the stick is held in place without falling out of the hole even when the cutting device is oriented upside down. The same benefit is obtained when the rotatable cutter is assembled by following the assembly steps in reverse order.

Further, the case may have an elastic member mounted on an inner peripheral surface of at least one of the holes to prevent the stick from falling out of the first and second holes. In this case, the stick inserted in the holes is held in place by friction created by an elastic force exerted by the elastic member. Therefore, the stick does not fall out of the holes even if the cutting device is oriented upside down.

In a preferred embodiment of the present invention, the biasing member has an elastic member extending straight across the first hole of the case. The stick is inserted into the first hole against a biasing force exerted by the elastic member, so that the stick is biased against the inner peripheral surface of the first hole by the biasing member, and is held in place.

In a further preferred embodiment of the present invention, the case further has a cylindrical portion projecting in a perpendicular direction with respect to the elongated axis of the first hole in the vicinity thereof The elastic member has a wound portion wound around the cylindrical portion and a straight portion that is connected to the wound portion and extending substantially straight across the first hole.

Therefore, the object of the present invention can be achieved by a simple structure that can be mounted on the case of conventional portable trimmers.

In a further preferred embodiment of the present invention, at least a portion of the case is formed of a flexible material, and the biasing member has a protrusion formed on a surface of the first hole so as to project into the first hole. The stick is inserted into the first and second holes against the elastic force exerted by the protrusion. When the operator removes his hand from the stick, the stick is biased against an inner peripheral surface of the first hole so that the stick is held in place.

The above and other objects and features of the present invention will become apparent from the following description made with reference to the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 1:
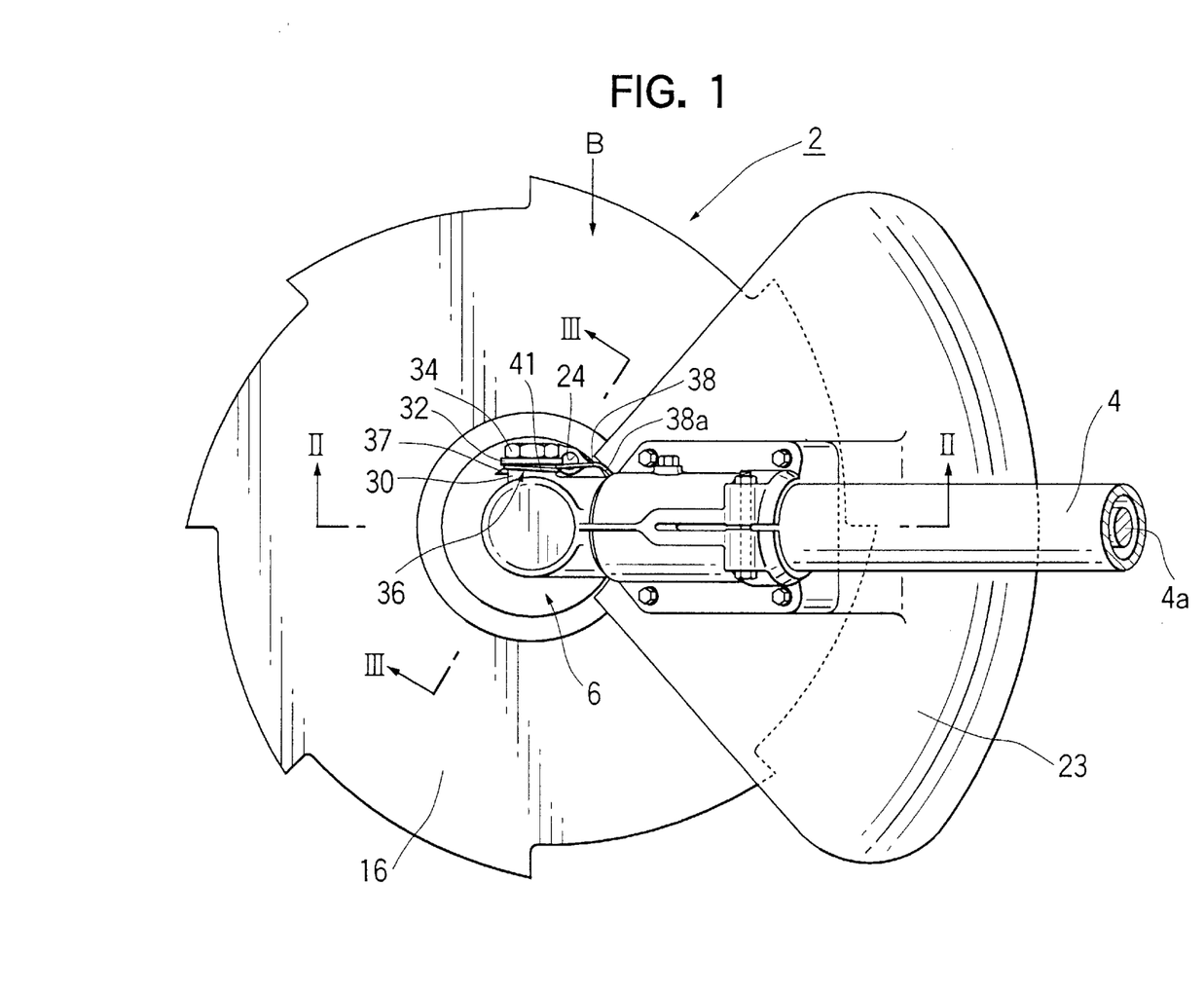
FIG. 1 is a plane view of a cutting device of a portable trimmer in accordance with a first embodiment of the present invention.
Figure 2:
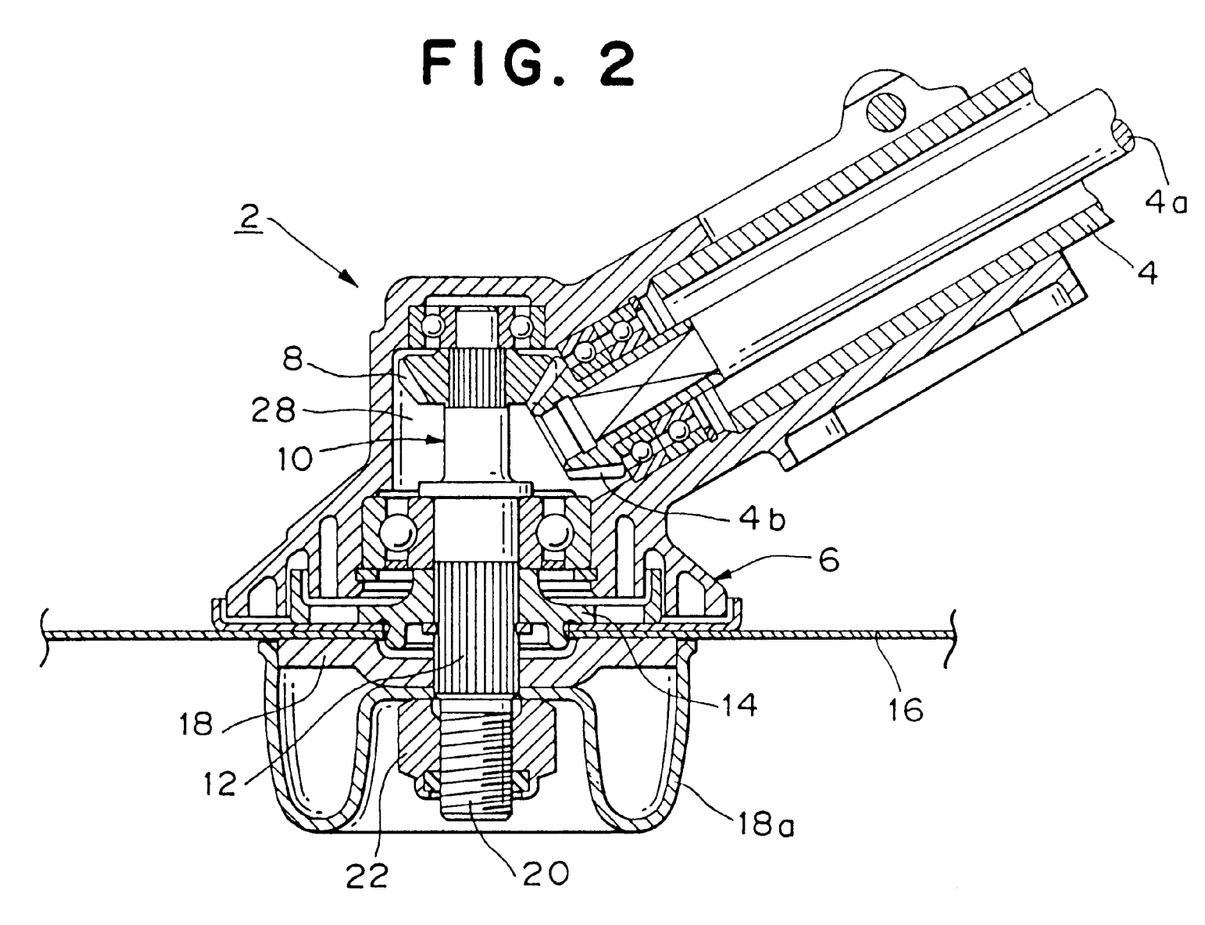
FIG. 2 is a cross-sectional view taken along a line II—II shown in FIG. 1.
Figure 9:
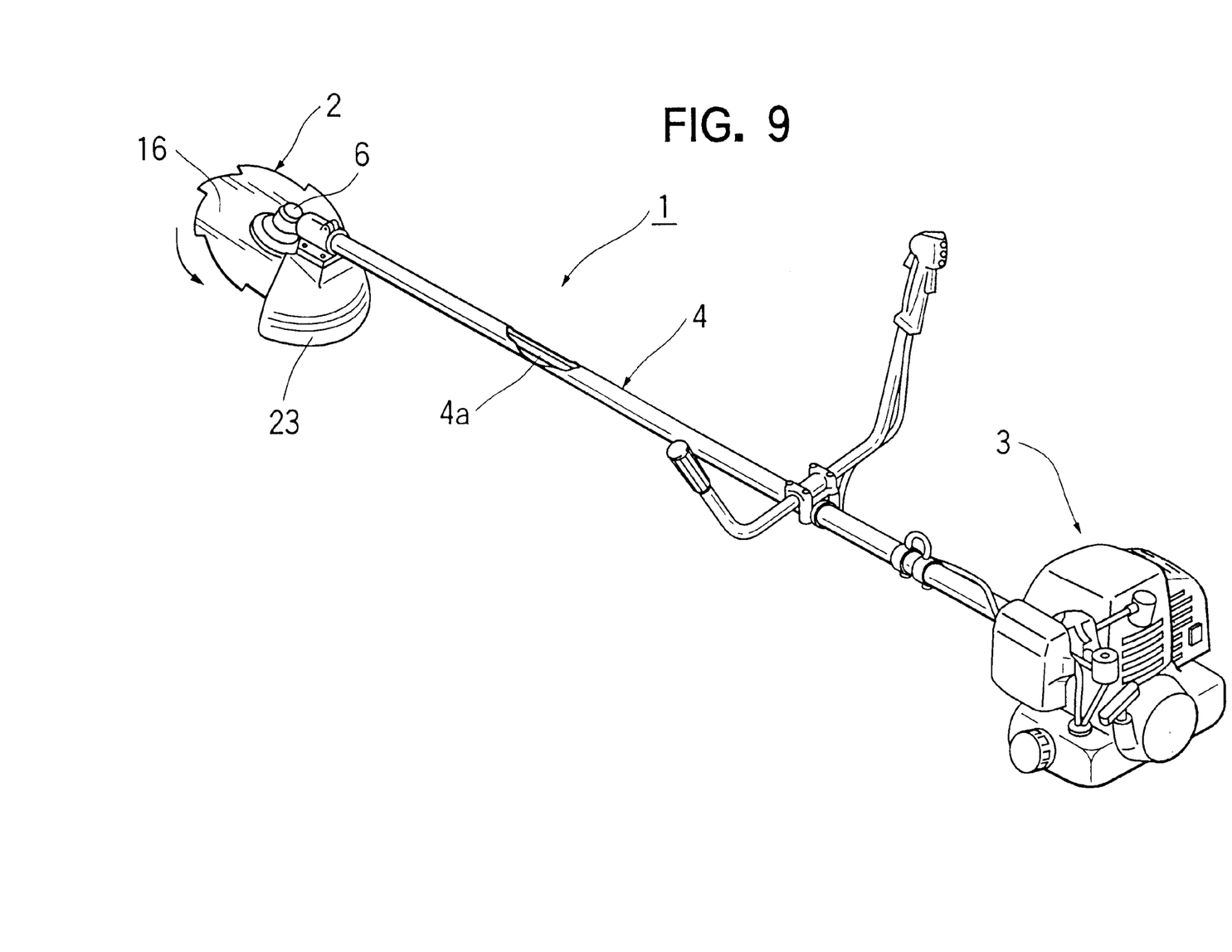
FIG. 9 is a perspective view showing a portable trimmer in accordance with the present invention.

As shown in FIGS. 1, 2 and 9, a portable trimmer 1 comprises driving means such as a compact air-cooled two stroke gasoline engine 3, a supporting tube 4 extending straight from the engine 3 in a forward direction and having a transmission shaft 4a inserted therein, and a cutting device 2 provided at a forward end of the supporting tube 4. The cutting device 2 has a gear case 6 fixed at the forward end of the supporting tube 4, and a rotatable shaft (cutter attaching shaft) 10 protruded from the gear case 6 toward the ground and accommodated in the gear case 6.

The rotatable shaft 10 is rotatably driven by a gear 8 meshed with a gear 4b that is mounted on the transmission shaft 4a. A spline 12 is formed on an outer surface of the rotatable shaft 10. A seating member (a cutter supporting member) 14 is assembled on the rotatable shaft 10 from the underside of the gear case 6 to fit on the spline 12 and rotates with the rotatable shaft 10.

A cutter 16 is mounted on the rotatable shaft 10 from the underside of the seating member 14. A retaining member 18 and a protecting cover 18a, which prevent a lower end of the rotatable shaft 10 from making contact with the ground, are assembled on the rotatable shaft 10. They are fixed to the rotatable shaft 10 by tightening a nut 22 that threadably engages male threads 20 formed on an outer surface of a lower end portion of the rotatable shaft 10.

Further, as shown in FIG. 1 (but omitted in FIG. 2 for purposes of clarity), a safety cover 23 is provided to cover a back portion of the cutter 16 so as to protect an operator from being hit by stones or the like scattered by the cutter 16.

Figure 3:
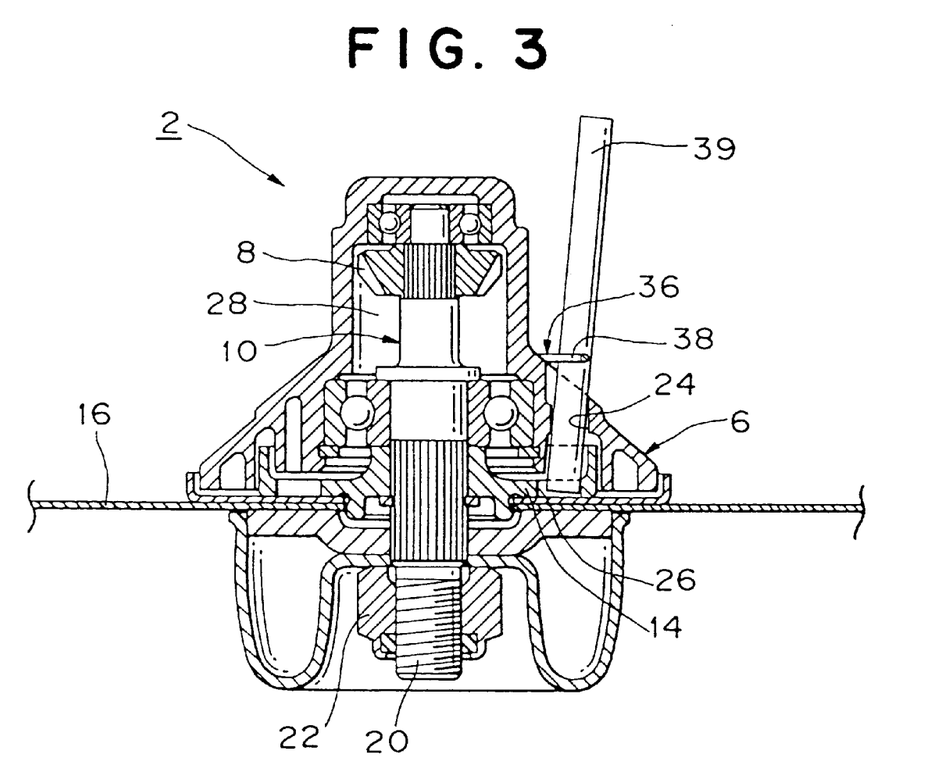
FIG. 3 is a cross-sectional view taken along a line III—III shown in FIG. 1.

As depicted in FIG. 3, a first through hole 24 that extends in a vertical direction is formed in the gear case 6 and a second through hole 26 that aligns with the first through hole 24 is formed in the seating member 14.

Figure 4:
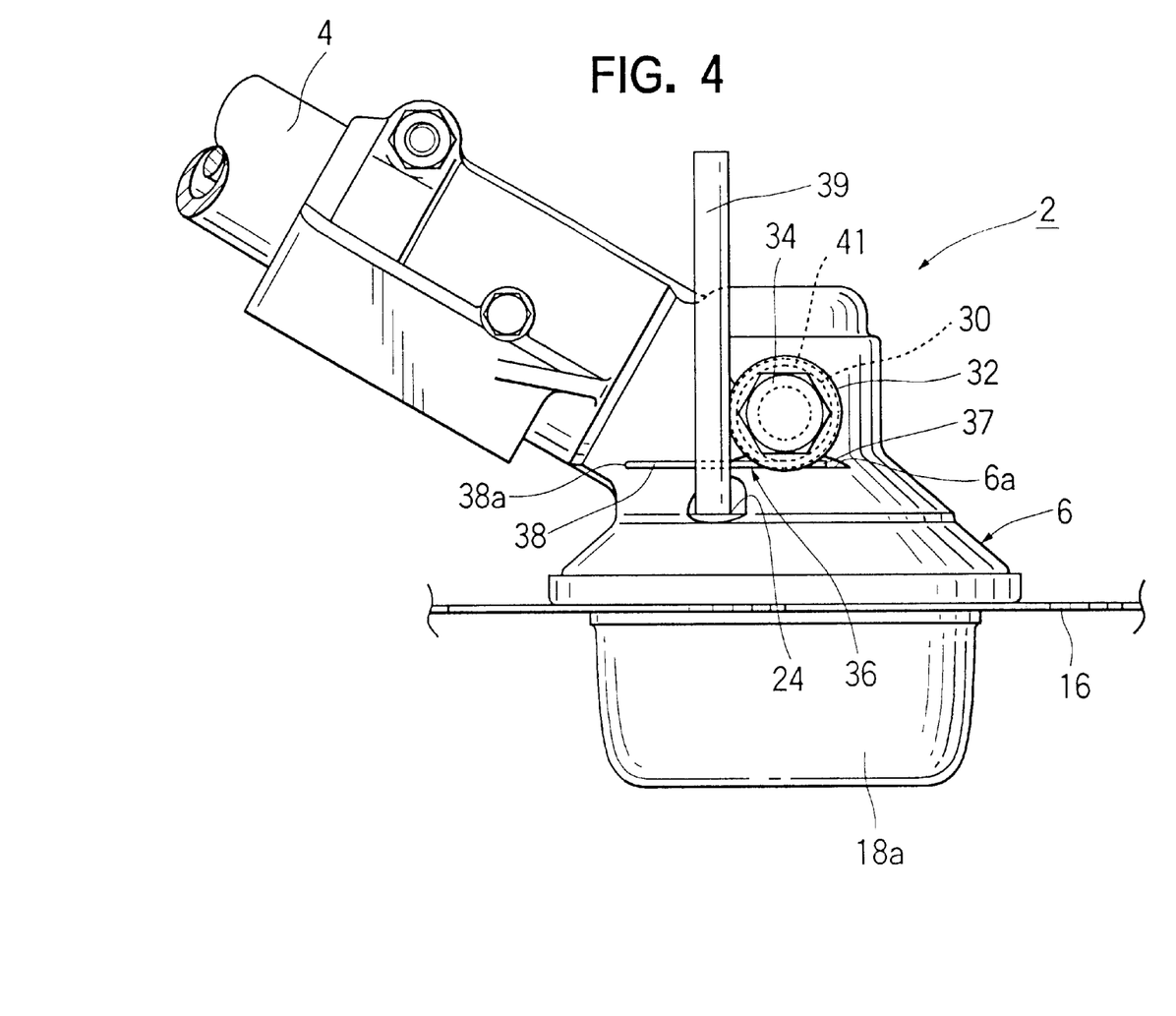
FIG. 4 is a side view of the cutting device as viewed in a direction indicated by an arrow B shown in FIG. 1.

As shown in FIGS. 1 and 4, a cylindrical inlet port 30, for supplying grease to a gear chamber 28 (FIG. 2), is formed in the gear case 6 on a right side surface thereof so that it projects radially outward as viewed in a horizontal plane. The inlet port 30 is sealed by a bolt 34 via a washer 32.

A biasing member such as wire spring 36, made of an elastic material, is provided around the cylindrical inlet port 30. The wire spring 36 has a first end portion 38 that extends straight across the first through hole 24 in lateral and rearward directions, a wound portion 41 that extends from the first end portion 38 helically in a radially inward direction with respect to the gear case 6, and a second end portion 37 that extends straight from the wound portion 41 to the side of the inlet port 30 opposite the first end portion 38. As shown in FIG. 1, a tip end portion 38a of the first end portion 38 is bent in a radially inward direction with respect to the gear case 6 in order to avoid scratching the operator's fingers.

The first end portion 38 and the second end portion 37 of the spring 36 are supported by a support surface 6a formed on an upper surface of the gear case 6 at a location below the inlet port 30, to prevent the spring 36 from rotating about the cylindrical inlet port 30.

To disassemble the cutter 16, a stick 39, for preventing rotation of the seating member 14, is inserted into the first through hole 24 on a side of the gear case 6 that is radially outward from the spring 36, thereby deflecting the first end portion 38 of the spring 36. The stick 39 is biased against an inner circumference surface of the first through hole 24 in a lateral direction by an elastic force exerted by the first end portion 38 of the spring 36, whereby the stick 39 is held in place in the second through hole 26.

Then, the operator turns the cutting device 2 upside down, removes the nut 22 with an appropriate tool, and removes the retaining member 18 and the cutter 16. The nut 22 can be easily removed because the rotation of the seating member 14 and the rotatable shaft 10 is prevented by the stick 39, which engages the inner circumference surface of the first through hole 24 of gear case 6.

A new (or newly-ground) cutter 16 is assembled following the steps stated above in reverse order. The cutter 16 and the retaining member 18 are mounted on the rotatable shaft 10. Then, the nut 22 is mounted on the shaft 10. As in the disassembly operation, the rotation of the seating member 14 and the rotatable shaft 10 is prevented by the stick 39. Therefore, cutter 16 can be firmly mounted on the rotatable shaft 10 by the nut 22.

Figure 5:
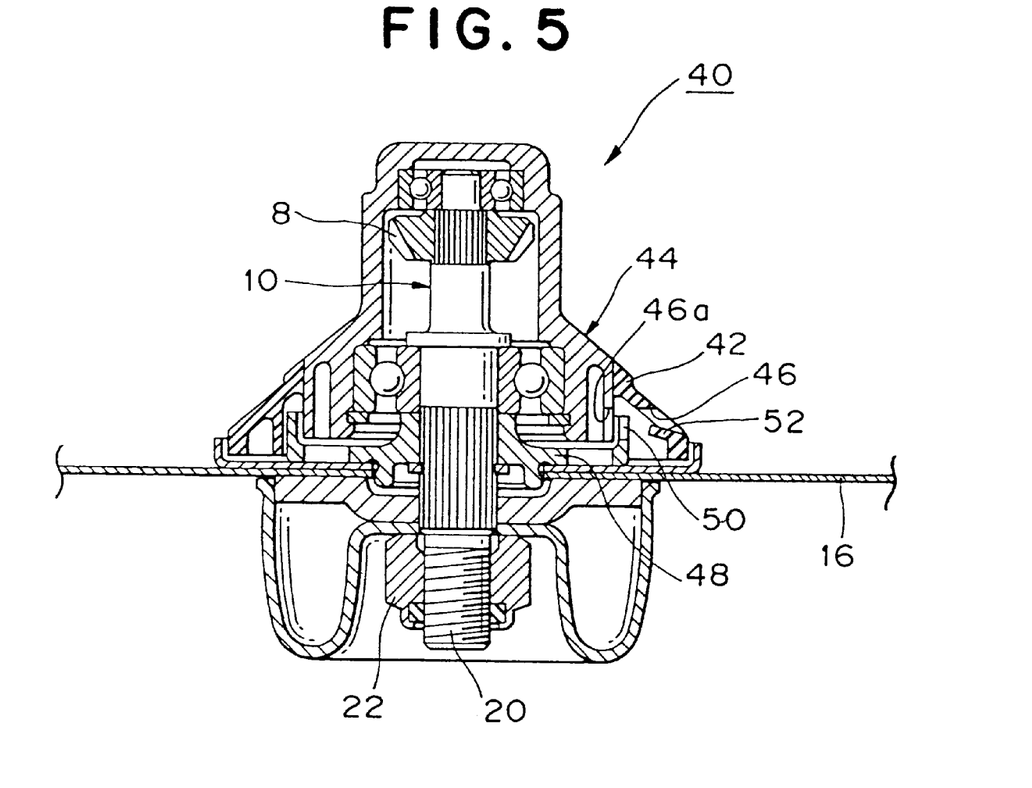
FIG. 5 is a cross-sectional view of a cutting device in accordance with a second embodiment of the present invention.

Except for the portion for inserting a stick 56, a cutting device in accordance with a second embodiment of the present invention in FIG. 5 is constructed in the same way as the first embodiment. Therefore, the explanation regarding the same elements as the first embodiment is omitted, for brevity.

Referring to FIG. 5, a cutting device 40 in accordance with the second embodiment of the present invention has a gear case 44. The gear case 44 has a skirt member 42 formed of synthetic resin having an appropriate flexibility mounted thereon which has a stick-insertion portion for preventing the rotation of a seating member 48.

First horizontally-extending through-holes 46, 46a are formed in the stick-insertion portion of the skirt member 42 and gear case 44, respectively. A horizontally-extending second through-hole 50 that aligns with the first horizontally extending through hole 46 is formed in the seating member 48. An elastic, synthetic-resin protrusion 52 projects upwardly within the first through-hole 46 from a lower part thereof.

Figure 6:
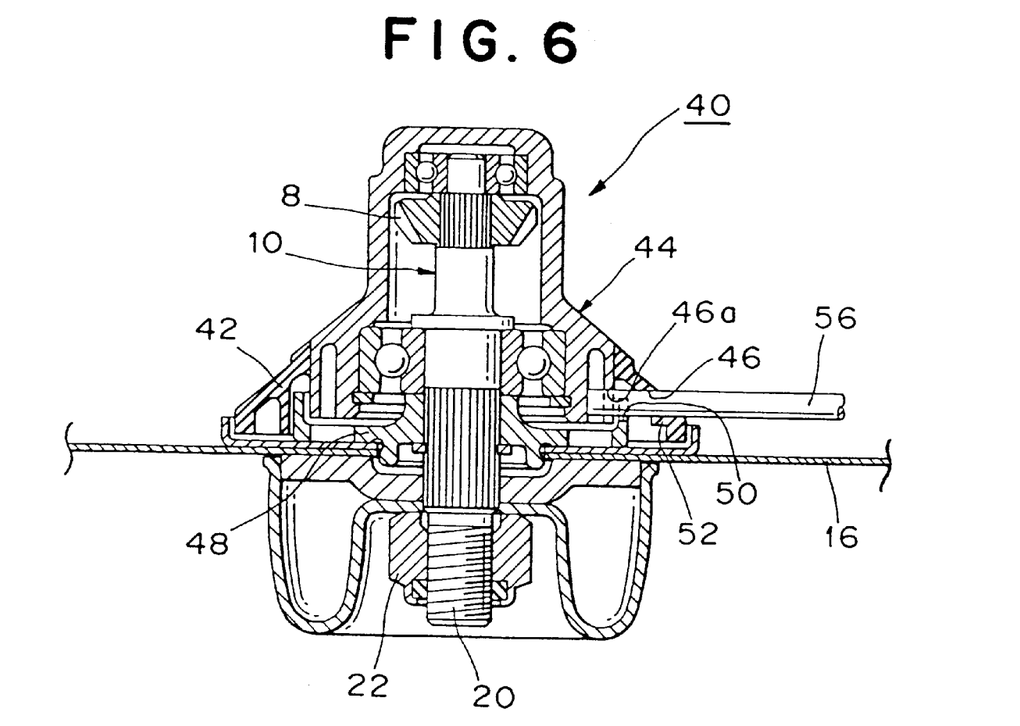
FIG. 6 is a view showing a stick inserted into the cutting device of the second embodiment shown in FIG. 5.

To disassemble the cutter 16, the stick 56 is inserted into the first through-holes 46, 46a and the second through hole 50, as shown in FIG. 6. The protrusion 52 is formed of synthetic resin having an elasticity so that when the operator removes his hand from the stick 56 after it is inserted in the through-holes 46, 46a, the protrusion 52 presses upwardly against the stick 56. This upward pressure biases the stick 56 upwardly against a circumferential surface of the first through-hole 46, so that the stick 56 is held in place even when the cutting device 40 is upside down.

Figure 7:
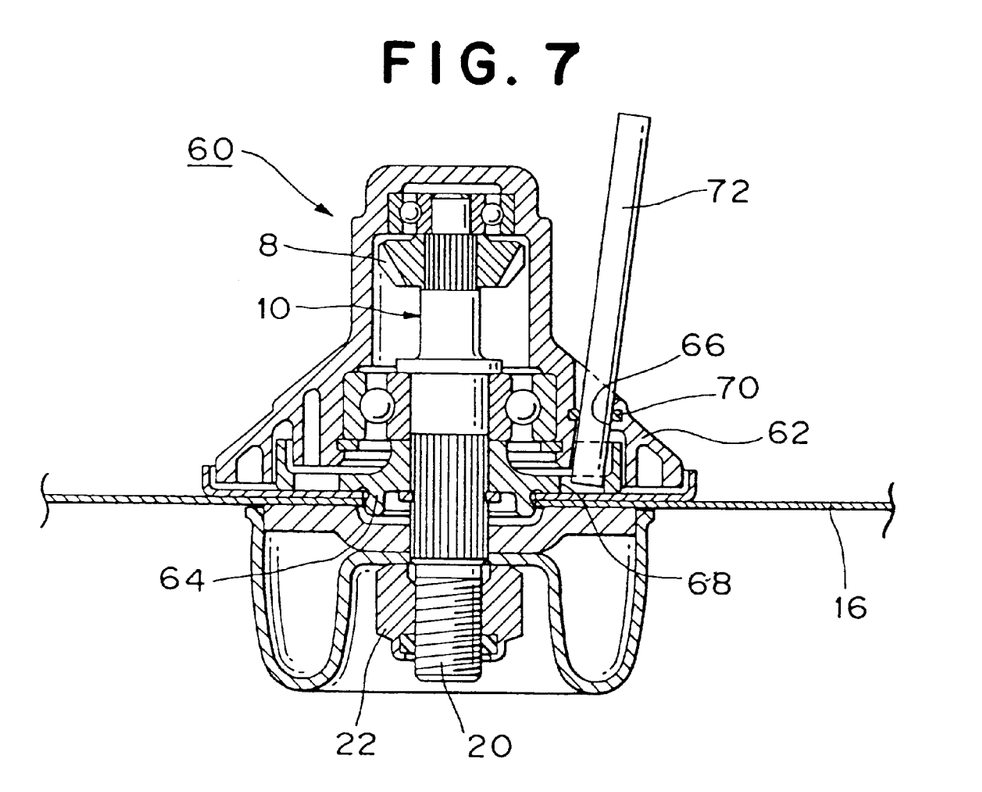
FIG. 7 is a cross-sectional view of a cutting device in accordance with a third embodiment of the present invention.

Referring to FIG. 7, except for a portion for inserting a stick 72, a cutting device 60 in accordance with a third embodiment of the present invention is constructed in the same way as the first embodiment. Therefore, the explanation regarding the same elements as the first embodiment is omitted, for brevity.

As in the first embodiment, a first through-hole 66 and a second through-hole 68 extend vertically in a gear case 62 of the cutting device 60 and a seating member 64. In the third embodiment, a rubber O-ring 70 is fitted into the first through-hole 66. The O-ring 70 has an inner diameter normally slightly smaller than a diameter of the stick 72. When the stick 72 is inserted into the first and second through-holes 66, 68, the O-ring 70 elastically holds the stick 72 in place within the first through-hole 66 by frictional engagement between the O-ring 70 and stick 72.

According to the present invention, the stick is prevented from falling during assembly and disassembly of the cutter. Further, such a benefit is achieved by a simple means that can be mounted on conventional portable trimmers.

The present invention has thus been shown and described with reference to specific embodiments. However, the present invention is in no way limited to the details of the described arrangements, and changes and modifications may be made without departing from the scope of the appended claims.

For example, although the wire spring 36 and the flexible protrusion 52 are utilized as biasing means in the first and second embodiments, respectively, the biasing means can be any means biasing sticks 39, 56 in a direction perpendicular to an elongated axis of the first through holes 34, 46.

Further, the sticks 39, 56, 72 in the first, second and third embodiments, respectively, are made out of straight round bar members. However, for example, an L-shaped hexagonal wrench can be utilized as such a stick.

Furthermore, in the first, second and third embodiments, holes 26, 50, 68 formed in the seating members 14, 48, 64, respectively, are illustrated as through-holes. However, they can also be dimples or protrusions formed therein, each of which engages with a respective stick 39, 56, or 72.

Moreover, means for connecting the transmission shaft 4a with the rotatable shaft 10 can be any appropriate means, such as a flexible shaft, a universal coupling, or the like, in addition to gears 4b and 8 as in the embodiments described above.

Accordingly, many modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A portable trimmer, comprising:
   a) a supporting tube; and
   b) a cutting device mounted on a forward end of the supporting tube and including:
      1) a case fixed to the forward end of the supporting tube, and having a first hole;
      2) a rotatable shaft, mounted within the case, and having an end portion with an outer surface on which threads are formed;
      3) a seating member, rotatable with the rotatable shaft, and having a second hole;
      4) a rotatable cutter that is removably mounted on the rotatable shaft;
      5) fastening means for fixing the rotatable cutter against the seating member by threadably engaging with the threads of the rotatable shaft;
      6) a separate stick for preventing rotation of the seating member; and
      7) biasing means, mounted on the case, for biasing the stick in a direction lateral to an elongated axis of the first hole, when the stick is inserted into the first hole and the second hole, and for slanting the protruding portion of the stick away from the case;
   wherein the through directions of the first and second holes extend substantially parallel to the axis of the rotatable shaft.

2. The portable trimmer of claim 1, wherein:
the biasing means includes an elastic member extending straight across the first hole of the case.

3. The portable trimmer of claim 2, wherein:
the case further includes a cylindrical portion projecting, in the vicinity of the first hole, in a direction perpendicular to an axis of the first hole; and
the elastic member includes (1) a wound portion wound around the cylindrical portion and (2) a straight portion that is connected with the wound portion and that extends substantially straight a cross the first hole.

4. The portable trimmer of claim 1, wherein:
the biasing means includes a flexible protrusion formed on a surface of the first hole so as to project into the first hole.

5. A portable trimmer, comprising:
a) a supporting tube; and
b) a cutting device, mounted on a forward end of the supporting tube, and including:
   1) a case fixed to the forward end of the supporting tube and having a first hole;
   2) a rotatable shaft, mounted within the case, and having an end portion with an outer surface on which threads are formed;
   3) a seating member, rotatable with the rotatable shaft, and having a second hole,
   4) a rotatable cutter that is removably mounted on the rotatable shaft;
   5) fastening means for fixing the rotatable cutter against the seating member by threadably engaging the threads of the rotatable shaft;
   6) a separate stick for preventing rotation of the seating member; and
   7) an elastic member, mounted on an inner peripheral surface of at least one of the holes, for preventing the stick from falling out of the first hole and the second hole, and for slanting the protruding portion of the stick away from the case;
wherein the through directions of the first and second holes extend substantially parallel to the axis of the rotatable shaft.

6. The portable trimmer of claim 5, wherein:
the elastic member includes an elastic O-shaped ring with a diameter that is normally smaller than a diameter of the stick.

* * * * *